United States Patent
Faust et al.

(10) Patent No.: US 6,750,267 B2
(45) Date of Patent: Jun. 15, 2004

(54) RADIATION-CURABLE POLYMERIC COMPOSITION

(75) Inventors: Rudolf Faust, Lexington, MA (US); Savvas Hadjikyriacou, Lowell, MA (US); Toshio Suzuki, Midland, MI (US); Maneesh Bahadur, Midland, MI (US)

(73) Assignees: University of Massachusetts Lowell, Lowell, MA (US); Dow Corning Corporation, Midland, MI (US)

( * ) Notice: Subject to any disclaimer, the term of this patent is extended or adjusted under 35 U.S.C. 154(b) by 313 days.

(21) Appl. No.: 10/036,096

(22) Filed: Dec. 24, 2001

(65) Prior Publication Data

US 2003/0162858 A1 Aug. 28, 2003

(51) Int. Cl.[7] .................... C08F 2/50; C08F 210/00; C08J 3/28
(52) U.S. Cl. .................... 522/31; 522/148; 522/150; 522/151; 522/155; 522/157; 522/158; 522/160; 526/258; 526/265; 526/266; 526/270; 526/256; 526/348.7
(58) Field of Search ................... 522/31, 66, 148, 522/150, 151, 155, 157, 158, 160; 526/348.7, 256, 258, 265, 266, 270, 335, 346, 347.1, 348, 348.2, 348.4

(56) References Cited

U.S. PATENT DOCUMENTS

| | | | |
|---|---|---|---|
| 4,276,394 A | 6/1981 | Kennedy et al. | |
| 4,568,732 A | 2/1986 | Kennedy et al. | |
| 5,260,378 A | 11/1993 | Gandini et al. | |
| 5,444,135 A * | 8/1995 | Cheradame et al. | 526/219.2 |
| 5,637,647 A | 6/1997 | Faust | |
| 5,665,837 A | 9/1997 | Faust et al. | |
| 5,677,386 A | 10/1997 | Faust | |
| 5,690,861 A | 11/1997 | Faust | |
| 5,731,379 A | 3/1998 | Kennan et al. | |
| 5,741,859 A | 4/1998 | Saxena et al. | |
| 5,777,044 A | 7/1998 | Faust | |
| 5,977,255 A | 11/1999 | Li et al. | |
| 5,981,785 A | 11/1999 | Faust et al. | |
| 6,034,179 A | 3/2000 | Feng et al. | |
| 6,046,281 A | 4/2000 | Faust et al. | |
| 6,051,657 A | 4/2000 | Faust et al. | |
| 6,054,549 A | 4/2000 | Bahadur et al. | |
| 6,069,185 A | 5/2000 | Bahadur et al. | |
| 6,194,597 B1 | 2/2001 | Faust et al. | |
| 6,242,058 B1 | 6/2001 | Bahadur et al. | |
| 6,469,115 B1 * | 10/2002 | Faust et al. | 528/194 |
| 6,492,449 B2 * | 12/2002 | Michot et al. | 524/401 |

FOREIGN PATENT DOCUMENTS

WO    WO99/09074    9/1999

OTHER PUBLICATIONS

Hadjikyriacou, S. and Faust, R, "Cationic Macromolecular Design and Synthesis Using Furan Derivatives", *Macromolecules, 32*(20) : 6393–6399, (1999).

Gandini, A., "Polymers from Renewable Resources" in *Comprehensive Polymer Science, Supplement 1*, L.S. Aggarwal and L.S. Rousso, eds. (Oxford, UK: Pergamon Press), p. 527 (1992).

Shepherd, V.L., et al., "Regulation of Mannose Receptor Expression in Macrophages, Recent Advances in Cellular and Molecular Biology", Molecular pathways of kinases, protein expression, blood pressure regulators, Ca–2 channels and molecular receptors, p. 287–300 (1992).

Santos, R., et al., New Telechelic Polymers and Sequential Copolymers by Polyfunctional Initiator–Transfer Agents (Inifers). XLI. Kinetic and Reactivity Studies on Sterically Hindered Inifers, *J. Polymer Science, Polymer Chemistry Edition*, 22:2685–2697 (1984).

Hadjikyriacou, Savvas, et al, "Cationic Macromolecular Design and Synthesis Using Furar Derivatives", Macromolecules, vol. 32 No. 20, Oct. 1999.

* cited by examiner

*Primary Examiner*—Susan W Berman
(74) *Attorney, Agent, or Firm*—Hamilton, Brook, Smith & Reynolds, P.C.

(57) ABSTRACT

Disclosed herein are radiation-curable polymers, a method of preparing radiation-curable polymers and compositions containing radiation-curable polymers. Radiation-curable polymers and compositions containing radiation-curable polymers are useful as coatings and adhesives.

17 Claims, No Drawings

RADIATION-CURABLE POLYMERIC COMPOSITION

BACKGROUND OF THE INVENTION

Hydrocarbon polymers which contain reactive functional groups suitable for crosslinking are known in the art. For example, polymers having a terminal hydroxy group can be reacted with a compound such as an allyl halide, an acrylic acid, an oxirane ring-containing compound having carbon-carbon double bonds, or an isocyanate compound containing a carbon-carbon double bonds to form a polymer having a crosslinkable end groups.

U.S. Pat. Nos. 6,054,549, 6,069,185 and 6,242,058 disclose a two step method of preparing polyisobutylene with reactive end-groups. The method involves first preparing an alkoxysilyl-functionalized polyisobutylene. Then the polyisobutylene is reacted with an alkenyl ether in the presence of a transesterification catalyst to form a polyisobutylene with vinyl ether end-groups.

In another approach, allylic functionality on polyisobutylene can be converted to hydroxyl by a hydroboration-oxidation sequence. This two-stage process employs treatment of the polymer with diborane or 9-borabicyclo{3.3.1}nonane (9-BBN), followed by reaction with hydrogen peroxide, to convert carbon to carbon double bonds to alcohol-containing groups. Hydroboration with diborane results in some secondary hydroxyl formation, whereas 9-BBN is highly regioselective and gives only primary alcohols. Thus, this technique may be used to prepare a polyisobutylene polymer having at least one end group of the formula $-CH_2CH_2CH_2OH$. This hydroxyl group can, in turn, be reacted with, e.g., acryloyl chloride to provide a polymer having an acrylate end group of the formula:

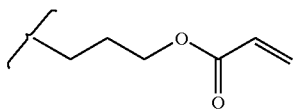

Unlike polymers which contain vinylic unsaturation, vinyl ethers and acrylic-functional polymers are desirable since they can be readily cured (i.e., crosslinked) by exposure to ultraviolet (UV) radiation when formulated with a photoinitiator. They therefore find utility in coating, ink and paint applications. However, the hydroboration of allyl-functional polyisobutylene is difficult because, in addition to being quite expensive, the boranes are flammable and react violently with water.

Therefore, there is a need for radiation curable compounds and methods of forming radiation curable compounds that is cost effective and overcomes or minimizes the above problems.

SUMMARY OF THE INVENTION

It has been discovered that a crosslinked polymer can be prepared from a composition containing a cationic photoinitiator and a radiation-curable polymer having the composition represented by Structural Formula I:

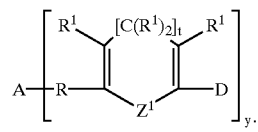

In Structural Formula I, A is a substituted or unsubstituted hydrocarbon. Preferably, A is phenyl or t-butylphenyl. R is a polymer chain. Preferably, R is a polymer chain that can be formed by cationic polymerization, such as poly (isobutylene). $Z^1$ is selected form $-O-$, $-S-$ and $-NR^7-$. Preferably, $Z^1$ is $-O-$ or $-S-$. D is selected from $-H$ or, alternatively, D is a group represented by Structural Formula II:

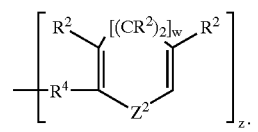

In Structural Formula II, $Z^2$ is selected from $-O-$, $-S-$ and $-NR^8-$. Preferably, $Z^2$ is $-O-$ or $-S-$. More preferably, $Z^2$ is the same as $Z^1$ and is $-O-$ or $-S-$. $R^1$ and $R^2$ for each occurrence are, independently, selected from the group consisting of $-H$, $-OR^5$, $-NR^5R^6$, a substituted or unsubstituted alkyl, a substituted or unsubstituted cycloalkyl, and a substituted or unsubstituted heterocycloalkyl. Preferably, $R^1$ and $R^2$ for each occurrence are $-H$. $R^4$ is selected from a substituted or unsubstituted alkylene, a substituted or unsubstituted cycloalkylene, a substituted or unsubstituted heteroalkylene, and a substituted or unsubstituted heterocycloalkylene. Preferably, $R^4$ is an alkylene group, such as methylene or an dimethylmethylene. $R^5$ and $R^6$ are each, independently, selected from the group consisting of $-H$, a substituted or unsubstituted alkyl, a substituted or unsubstituted cycloalkyl, and a substituted or unsubstituted heterocycloalkyl. Alternatively, $R^5$ and $R^6$ together with the nitrogen to which they are attached form a substituted or unsubstituted heterocycloalkyl. $R^7$ and $R^8$ are each, independently, selected from the group consisting of $-H$, a substituted or unsubstituted alkyl, a substituted or unsubstituted cycloalkyl, and a substituted or unsubstituted heterocycloalkyl. t and w are each independently 0 or an integer from 1–5. Preferably, both t and w are 0. y and z are each, independently, a positive integer. Preferably, z is a positive integer from 1–5. More preferably, z is 1.

The cationic photoinitiator of the composition is preferably an onium salt, a diaryliodonium salt of sulfonic acid, a triarylsulfonium salt of sulfonic acid, a diaryliodonium salt of boric acid, and a triarylsulfonium salt of boric acid.

The composition can be cured to form a crosslinked polymer by exposing the mixture to radiation of sufficient energy for sufficient time to cause at least 5% of the heterocyclic end groups to crosslink. In a preferred embodiment, the mixture is exposed to sufficient energy for sufficient time to cause at least 50% of the heterocyclic end groups. In a more preferred embodiment, the mixture is exposed to sufficient energy for sufficient time to cause at least 80% of the heterocyclic end groups.

In one embodiment a radiation-curable polymer can be represented by Structural Formula III:

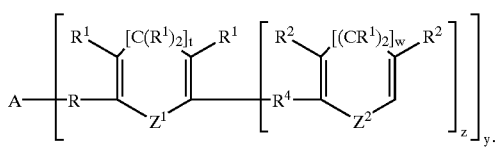

In Structural Formula III, A, R, $Z^1$, $Z^2$, $R^1$, $R^2$, $R^4$, t, w, y and z are defined as above.

The present invention further relates to a method of making an article of manufacture. The article of manufacture is made by applying a radiation-curable composition that contains a radiation-curable polymer represented by Structural Formula I and a cationic photoinitiator, to a solid substrate to form a coating. The coating is then exposed to an energy source such as ultraviolet light or visible light in an amount sufficient to cure the coating.

Radiation-curable polymers of the invention can be prepared by contacting under reaction conditions a cationically polymerizable monomer with a cationic polymerization catalyst to produce a living polymer. The living polymer is then reacted with an end capping compound represented by Structural Formula IV:

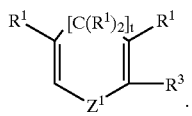

In Structural Formula IV, $Z^1$, $R^1$, and t are defined as above. $R^3$ is —$Sn(R^{18})_3$, —$Si(R^{18})_3$ or —D. Thus, radiation-curable polymers of the present invention can be prepared in a one-pot synthesis.

The heterocyclic end groups of radiation-curable polymers represented by Structural Formula I or III generally react rapidly in the presence of a cationic photoinitiator and radiation to form covalent bonds with other heterocyclic end groups. Radiation curing is advantageous because it is relatively low cost, easy to maintain and has low potential hazard to industrial users. In addition, curing times are much shorter than other curing methods, and heat-sensitive materials can be safely coated and cured under visible or ultraviolet (UV) light where thermal energy might damage the substrate. Thus, compositions containing one or more radiation-curable polymers represented by Structural Formula I or III are useful in forming coatings or adhesives.

DETAILED DESCRIPTION OF THE INVENTION

The term "crosslinked polymer" refers to a polymer network in which covalent bonds have been formed between polymer chains.

A radiation-curable polymer is a polymer that can be crosslinked by exposure to radiation.

A hydrocarbon is moiety that primarily contains carbons and hydrogens.

The term "polymer chain," as used herein, refers to polymers chains, oligomers chains and copolymers chains which can be either linear or branched. A polymer chain is prepared from one or more monomer, wherein each monomer reacts with growing polymer chain to form a polymer chain composed of a repeating monomer unit. Typically, a polymer chain of the invention has between about 5 and about 10,000 repeat units. In one embodiment, the polymer chain has at least 30 repeat units. More preferably, the polymer chain will have between about 50 and about 1000 repeat units. One or more different monomers may be used to form the polymer chain. Preferred polymer chains are prepared by cationic polymerization from monomers containing at least one double bond. Preferred monomers for preparing polymer chains are olefins that have electron-donating substituent groups. Preferably, monomers useful in preparing polymer chains having from 4 to 20 carbon atoms. For example, polymer chains can be prepared from isobutylene, vinyl ethers, 2-methyl-butylene, 3-methyl-1-butylene, 1,3-butadiene, 4-methyl-1-pentene, and 2-methyl-2-pentene. Preferably, the polymer chain is poly (isobutylene).

As used herein the term "poly(isobutylene)" refers to homogeneous poly(isobutylene), as well as copolymers of poly(isobutylene) wherein at least about 50 mole percent, preferably at least 80 mole percent of the repeat units are isobutylene units having the following structural formula:

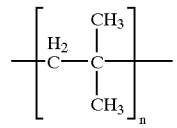

wherein n is a positive integer. Preferably, n is a value from about 5 to about 10,000.

Alkyl groups, as used herein, include straight chained or branched $C_1-C_{18}$ hydrocarbons which are completely saturated. $C_1-C_6$ alkyl groups are preferred.

Alkoxy groups are alkyl groups that are linked to a compound through an oxygen (i.e., —O—alkyl).

Cycloalkyl groups are cyclic $C_3-C_{18}$ hydrocarbons which are non-aromatic. $C_3-C_8$ cycloalkyl groups are preferred.

A heterocycloalkyl group, as used herein, is a non-aromatic ring system that preferably has five to six atoms and includes at least one heteroatom selected from nitrogen, oxygen, and sulfur. Examples of heterocyclalkyl groups include morpholinyl, piperidinyl, piperazinyl, thiomorpholinyl, pyrrolidinyl, thiazolidinyl, tetrahydrothienyl, azetidinyl, tetrahydrofuryl, dioxanyl and dioxepanyl.

Aryl groups include carbocyclic aromatic ring systems (e.g., phenyl) and carbocyclic aromatic ring systems fused to one or more carbocyclic aromatic (e.g., naphthyl and anthracenyl) or an aromatic ring system fused to one or more non-aromatic ring (e.g., 1,2,3,4-tetrahydronaphthyl).

Heteroaryl groups, as used herein, include aromatic ring systems that have one or more heteroatom selected from sulfur, nitrogen or oxygen in the aromatic ring (e.g., thiophenyl, furyl, pyridyl, pyrazole, isoxazolyl, thiadiazolyl, oxadiazolyl, indazolyl, pyrroles, imidazoles, triazoles, pyrimidines, pyrazines, thiazoles, isoxazoles, isothiazoles, tetrazoles, oxadiazoles, benzo(b)thienyl, benzimidazole, indole, tetrahydroindole, azaindole, indazole, quinoline, imidazopyridine, purine, pyrrolo[2,3-d]pyrimidine, and pyrazolo[3,4-d]pyrimidine). Preferably, heteroaryl groups are five membered ring systems having one heteroatom, for example thiophenyl or furyl.

Heterocycle groups, as used herein, include heterocycloalkyl groups as well as heteroaryl groups.

Suitable substituents for hydrocarbons, alkyl groups, cycloalkyl groups, and heterocycloalkyl groups include aryl, halogenated aryl, alkyl, —$NR^{14}R^{15}$, halogenated alkyl (e.g. trifluoromethyl and trichloromethyl), —O-(alkyl or substituted alkyl), —O-(aryl or substituted aryl), benzyl, substituted benzyl, halogens, cyano, nitro, —S-(alkyl or substituted alkyl), and —S-(aryl or substituted aryl). $R^{14}$ and $R^{15}$ are each, independently, —H, an alkyl, a cycloalkyl, or a heterocycloalkyl. Alternatively, $R^{14}$ and $R^{15}$, taken together with the nitrogen to which they are attached form a substituted or unsubstituted heterocycloalkyl.

Radiation-curable compositions of the invention include at least one radiation-curable polymer represented by Structural Formula I:

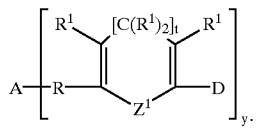

In Structural Formula A, R, $R^1$, D, $Z^1$, t and y are as defined above.

In one embodiment, radiation-curable compositions include at least one radiation-curable polymer represented by Structural Formula V:

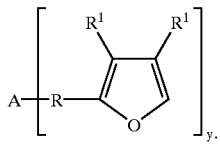

In Structural Formula V, A, R, $R^1$, and y are as defined above. In a more preferred embodiment, R is poly (isobutylene) and $R^1$ for each occurrence is —H.

In another embodiment, radiation-curable compositions include at least one radiation-curable polymer represented by Structural Formula VI:

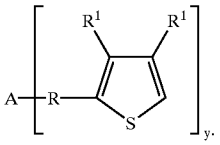

In Structural Formula VI, A, R, $R^1$, and y are as defined above. In a more preferred embodiment, R is poly (isobutylene) and $R^1$ for each occurrence is —H.

In a preferred embodiment, radiation-curable compositions contain at least one radiation-curable polymer represented by Structural Formula III:

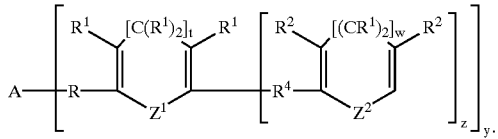

In Structural Formula VII, A, R, $R^1$, $R^2$, $R^4$, $Z^1$, $Z^2$, t, w, z and y are defined as above.

In another preferred embodiment, radiation-curable compositions contain at least one radiation-curable polymer represented by Structural Formula VII:

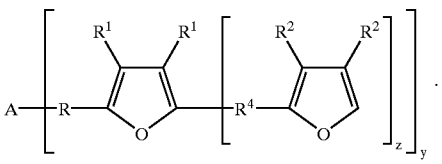

In Structural Formula VII, A, R, $R^1$, $R^2$, $R^4$, y and z are as defined above. In a preferred embodiment, R is poly (isobutylene), $R^1$ and $R^2$ for each occurrence are —H, $R^4$ is methyl or dimethylmethylene and z is 1.

In another preferred embodiment, radiation-curable compositions contain a radiation-curable polymer represented by Structural Formula VIII:

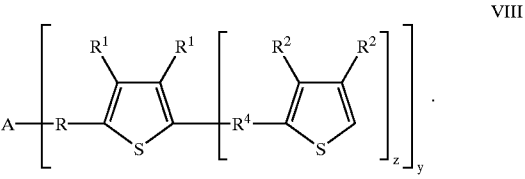

In Structural Formula VIII, A, R, $R^1$, $R^2$, $R^4$, y and z are as defined above. In a preferred embodiment, R is poly (isobutylene), $R^1$ and $R^2$ for each occurrence are —H, $R^4$ is methyl or dimethylmethylene and z is 1.

Radiation-curable polymers that are present in the radiation-curable compositions of the invention are preferably prepared in a one pot synthesis via cationic polymerization followed by an end-capping step. In a first step, a cationic polymerizable monomer, such as isobutylene, is added to a mixture of a cationic polymerization catalyst in an aprotic solvent to form a living cationic polymer. Generally, a living cationic polymer is a polymer that is prepared by cationic polymerization in which the polymer chains continue to grow from the site of initiation until the monomer supply is exhausted rather than terminate when the chain reaches a certain length or the catalyst is exhausted. The cationic polymerization catalyst is a lewis acid, such as $BF_3$, $BF_3$—$O(C_2H_5)_2$, $BCl_3$, $TiCl_4$, $AlCl_3$, or $SnCl_4$. Preferably, the Lewis acid is $BCl_3$ or $TiCl_4$. Typically, the cationic polymerization catalyst is present in the solution in about a 1.0 M to about a 0.001 M concentration. Preferably, the mixture of the cationic polymerization catalyst is cooled to about −20° C. to about −100° C. before addition of the cationic polymerizable monomer. Typically, the concentration of the monomer after addition is about 0.1 M to about 1.0 M.

In a preferred embodiment, an initiator is added to the mixture of the cationic polymerization catalyst prior to adding the cationic polymerizable monomer. The initiator is a compound that can react with the cationic polymerization catalyst to form a cation. When the cationic polymerizable monomer is added the monomer adds to the initiator at the cationic site. Generally, initiators are alkyl halides or (haloalkyl)-aryl compounds. Secondary or tertiary halides are preferred initiators. Initiators that have two or more sites that can form a cation when contacted with a cationic polymerization catalyst can also be used. Thus, a polymer chain can grow from more sites on the initiator forming a telechelic or starbranched polymer. Preferred initiators include 2-chloro-2,4,4-trimethylpentane, 1,3-di(1-chloro-1-methylethyl)-5-(t-butyl)benzene and 1,3,5-tri(1-chloro-1-methylethyl)benzene.

Typically, after about 1 h to about 8 h or when the monomer supply is exhausted, an end-capping compound is added to the living polymer mixture. End-capping compounds can be represented by Structural Formula IV:

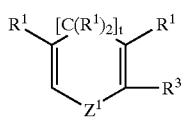

IV

In Structural Formula IV, $R^1$, $Z^1$, $R^3$, and t are defined as above. In a preferred embodiment, the end-capping compound is represented by Structural Formula IX:

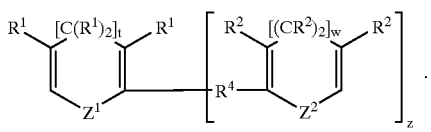

IX

In Structural Formula IX, $R^1$, $R^2$, $R^4$, $Z^1$, $Z^2$, t, w, and z are defined as above. End-capping compounds can react with living polymer chains to form a radiation-curable polymer represented by formulas I, III, V, VI, VII, or VIII. Typically, after addition of the end-capping compound, reaction mixture is maintained at about 0° C. to about −100° C. for about 1 h to about 5 h.

A radiation-curable composition of the invention also includes a cationic photoinitiator. Suitable cationic photoinitiators are selected from the group consisting of onium salts, diaryliodonium salts of sulfonic acids, triarylsulfonium salts of sulfonic acids, diaryliodonium salts of boronic acids, and triarylsulfonium salts of boronic acids. Preferably the cationic photoinitiator is present in about 0.01 to about 5.0 weight percent based on the total weight of the composition. Preferably, the cationic photoinitiator is present in about 0.1 to about 2.0 weight percent based on the total weight of the radiation-curable composition.

The onium salts are preferably selected from the group consisting of $R^{16}_2I^+MX_z^-$, $R^{16}_3S^+MX_z^-$, $R^{16}_3Se^+MX_z^-$, $R^{16}_4P^+MX_z^-$, and $R^{16}_4N^+MX_z^-$, wherein each $R^{16}$ is an organic group having from 1 to 30 carbon atoms exemplified by aromatic carbocyclic groups having from 6 to 20 carbon atoms. Each $R^{16}$ can be substituted with from 1 to 4 substituents selected from alkoxy groups having from 1 to 8 carbon atoms, alkyl groups having from 1 to 16 carbon atoms, nitro, chloro, bromo, cyano, carboxyl, mercapto, and heteroaryl groups exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Cd. Pr, and Nd, and metalloids exemplified by B, P, and As. $MX_z^-$ is a non-basic, non-nucleophilic anion exemplified by $BF_4^-$, $PF_6^-$, $AsF_6^-$, $SbF_6^-$, $SbCl_6^-$, $HSO_4^-$, $ClO_4^-$, $FeCl_4^{-2}$, $SnCl_6^-$, and $BiCl_5^{-2}$.

Preferred onium salts are exemplified by bis-diaryl iodonium salts, for example, bis(dodecyl phenyl) iodonium hexafluoroarsenate, bis(dodecylphenyl) iodonium hexafluoroantimonaate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as the cationic photoinitiator. Preferred diaryliodonium salts of sulfonic acid are diaryliodonium salts of perfluoroalkylsulfonic acids and diaryliodonium salts of aryl sulfonic acids. Preferred diaryliodonium salts of perfluoroalkylsulfonic acids are exemplified by diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethane sulfonic acid. Preferred diaryliodonium salts of aryl sulfonic acids are exemplified by diaryliodonium salts of p-toluene sulfonic acid, diaryliodonium salts of dodecylbenzene sulfonic acid, diaryliodonium slats of benzene sulfonic acid, and diaryliodonium salts of 3-nitrobenzene sulfonic acid.

Preferred triarylsulfonium salts of sulfonic acid are triarylsulfonoium salts of perfluoroalkylsulfonic acids and triarylsulfonium salts of aryl sulfonic acids. Preferred triarylsulfonium salts of perfluoroalkylsulfonic acids are exemplified by triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids are exemplified by triarylsulfonium salts of p-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922, the entire teachings of which are incorporated herein by reference. Preferred diaryliodonium salts of boronic acids include diaryliodonium salts of perhaloarylboronic acids and preferred triarylsulfonium salts of boronic acids are the triarylsulfonium salts of perhaloarylboronic acid.

Various optional components may be used in the composition beyond the radiation-curable polymer and the cationic photoinitiator. For example, the speed of the cationic photocuring process can be increased by using one or more reactive diluents, one or more free radical photoinitiators and photosensitizers. In addition, the use of non-reactive diluents may be used to efficiently disperse the photocatalyst, photoinitiators and photosensitizers into the radiation-curable polymer matrix.

A reactive diluent in the compositions of the invention is a miscible compound having the formula $[R^{17}]Z_b$, wherein $R^{17}$ is an organic group, such as a substituted or unsubstituted alkyl, a substituted or unsubstituted cycloalkyl, or a substituted or unsubstituted heterocycloalkyl. Z is an organic group containing at-least one vinyl ether or acrylate functional group. b is an integer from 1 to 4. The $R^{17}$ group is selected to be the one that is compatible with the radiation-curable polymer. The $R^{17}$ group has between 2 to 30 carbon atoms, and preferably between 4 to 18 carbon atoms. The acrylate functional reactive diluent can be monofunctional, difunctional, or trifunctional. Examples of monofunctional reactive diluents are butyl vinyl ether, t-butyl vinyl ether, t-amyl vinyl ether, hexyl vinyl ether, cyclohexyl vinyl ether, 2-ethylhexyl vinyl ether, isooctyl vinyl ether, isodecyl vinyl ether, dodecyl vinyl ether, lauryl vinyl ether, butyl crylate, t-butyl acrylate, t-amyl acrylate, hexyl acrylate, cyclohexyl acrylate, 2-ethylhexyl acrylate, isooctyl acrylate, isodecyl acrylate, dodecyl acrylate, lauryl acrylate. Examples of difunctional reactive diluents are butanediol divinyl ether, hexanediol divinyl ether, and cyclohexane dimethanol divinyl ether; butanediol diacrylate, hexanediol diacrylate, and cyclohexane dimethanol diacrylate. Examples of trifunctional reactive diluents are: trimethanolpropane trivinylether and trimethanolpropane triacrylate.

Preferably the amount of miscible reactive diluent is from about 1 to about 60 weight percent based on the total weight of the composition. Preferably, the reactive diluent can be present in about 5 to about 40 weight percent based on the total weight of the radiation-curable composition.

The free radical photoinitiators of that are optionally present in compositions of the invention can be benzoins (e.g., benzoin alkyl ethers), benzophenone and its derivatives (e.g., 4,4'-dimethyl-amino-benzophenone), acetophenones (e.g., dialkoxyacetophenones, dichloroacetophenones, and trichloroacetophenones), benzils (e.g., benzil ketals), quinones, and O-acylated-α-oximinoketones. Preferably the free radical photoinitiator is a compound represented by Structural Formula X:

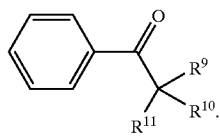

X

In Structural Formula X, $R^9$ is —H, a substituted or unsubstituted alkoxy, or a halogen. $R^{10}$ is —OH, a substituted or unsubstituted alkoxy, or a halogen. $R^{11}$ is —H, a substituted or unsubstituted alkyl, a substituted or unsubstituted aryl, or a halogen. Preferred embodiments of the compound represented by Structural Formula X include compounds wherein: (i) —$R^9$ is methyl, —$R^{10}$ is —OH and —$R^{11}$ is methyl or phenyl; (ii) —$R^9$ is —H, —$R^{10}$ is an alkoxy group and —$R^{11}$ is phenyl (e.g., benzoin alkyl ethers); (iii) —$R^9$ and —$R^{10}$ are alkoxy groups and —$R^{11}$ is phenyl (e.g., benzil ketals); (iv) —$R^9$ and —$R^{10}$ are alkoxy groups and —$R^{11}$ is —H (e.g., dialkoxyacetophenones); and (v) —$R^9$ and —$R^{10}$ are —Cl and $R^{11}$ is —Cl or —H (e.g., di-and tri-chloroacetophenones). A more preferred free radical photoinitiator is Darocur® 1173 (i.e., 2-hydroxy-2-methyl-1-phenyl-propan-1-one).

Preferably, the amount of free radical photoinitiator is from 0.01 to 5.0 weight percent based on the total weight of the composition. More preferably the free radical photoinitiator can be present in about 0.1 to about 2.0 weight percent based on the total weight of the radiation-curable composition.

Preferred photosensitizers are 2-isopropylthioxanthone or benzophenone. Preferably the amount of photosensitizer is about 0.01 to about 2.0 weight percent based on the total weight of the composition. Preferably, the amount of photosensitizer used is about 0.05 to about 0.5 weight percent based on the total weight of the radiation-curable composition.

Preferred non-reactive diluents are hydrocarbon diluents with $C_4$-$C_{20}$ hydrocarbon chain length or $C_4$-$C_{20}$ hydrocarbons substituted with epoxy, ester, ether, glycidyl ether, anhydride and carbonyl functional groups. Suitable examples include methyl laurate, methyl nonate, ethyl laurate, dioctyl adipate, di-(2-ethylhexyl) phthalate, di-2-ethylhexyl ether, dioctadecyl ether, dodecylene epoxide, hexyl glycidyl ether, and succinic anhydride. Preferably, the amount of non-reactive diluent is from about 0.01 to about 30 weight percent based on the total weight of the composition. More preferably, the non-reactive diluent is present in about 0.05 to about 5.0 weight percent based on the total weight of the radiation-curable composition.

To improve thermal and oxidative stability of the cured coating, one or more stabilizers may be included in the composition. Examples of suitable stabilizers are hindered amines, organic phosphites, hindered phenols, and mixtures thereof. Preferred stabilizers include: Irganox™ 1520D; Irganox™ 1010, Tinuvin™ 123 and Tinuvin™ 292. Preferably, the amount of stabilizer is from about 0.01 to about 20 weight percent based on the total weight of the composition. More preferably, the stabilizer is present in about 0.05 to about 5.0 weight percent based on the total weight of the radiation-curable composition.

To improve stability of the un-cured coating one or more stabilizers may be included in the composition. This requires the use of stable photoinitiator compositions as described in the U.S. Pat. No. 5,973,020, the entire teachings of which are incorporated herein by reference. Preferably, these stabilizing agents are hindered amines with boiling points of greater than 150° C. and preferably greater than 200° C. The amine can be a primary, secondary or tertiary amine and are preferably a secondary or tertiary amine. Examples are Tinuvin products sold by Ciba Speciality Chemical Company, the CYAGARD products sold commercially by Cytec Corporation (Stamford, Conn.) and SANDUVAR products as referenced in the U.S. Pat. No. 5,973,020.

Preferably, the amount of stabilizer used to stabilize the un-cured coting, by weight in relation to the total weight of the cationic photoinitiator is from about 0.01 to about 2.0 percent by weight of the cationic photoinitiator and is preferably between about 0.2 to about 1.0 weight percent.

The radiation-curable compositions of this invention can be prepared by mixing a radiation-curable polymer, a photoinitiator and any optional components in any order, using any suitable mixing means, such as a spatula, a drum roller, a mechanical stirrer, a three-roll mill, a sigma blade mixer, a bread dough mixer, or a two-roll mill.

The present invention further relates to a method of making an article of manufacture. The method involves applying a radiation-curable composition containing a radiation-curable compound and a cationic photoinitiator as described hereinabove, to a solid substrate to form a coating. The coating is then exposed to an energy source such as ultraviolet light or visible light in an amount sufficient to cure the coating.

The coating may be applied by any suitable manner known in the art, such as by spreading, brushing, dipping, extruding, spraying, gravure, kiss-roll and air-knife.

The solid substrate can be a flexible sheet material such as paper, polyolefin film, polyolefin-coated paper, foil, wood, cardboard and cotton, metallic materials such as aluminum, copper, steel and silver, siliceous materials such as glass and stone, and synthetic polymer materials such as polyolefins, polyamides, polyesters and polyacrylates. As to form, the solid substrate can be substantially sheet-like, such as a peelable release liner for pressure sensitive adhesive, a fabric or a foil, or a fiber, or a substantially three-dimensional in form.

Curing itself may be achieved in any of the known ways, including passing a coated substrate under the desired source of radiation, for example a UV lamp, at a predetermined rate and exposing a completely coated substrate to radiation by switching on the required energy source for a predetermined time. Typically, the curing energy used is about 50 mJ/cm² to about 2000 mJ/cm².

The radiation-curable compositions are preferably cured in the form of films. The cured films are expected to good barrier properties, good adhesion and good damping properties. It is preferable to apply these coatings to surfaces that are adversely affected by exposure to oxygen, moisture vapor and other environmental factors. The radiation-curable coatings may be useful as high refractive index coatings for optical fibers. The application of the radiation-curable compositions to optical fibers and curing of the compositions can be achieved by conventional equipment (see Blyler and Aloisio, *Polymers for Coating Optical Fibers*, Chemtech, November, 1987, pages 680–684, the entire teachings of which are incorporated herein by reference). The curable compositions can also be used as an additive to compositions whose barrier properties needs to be tailored to higher values. The radiation-curable compositions can be used to increase the barrier properties of sealants and pottants used for encapsulating electronic devices that are adversely affected by moisture.

EXAMPLES

The following examples illustrate the invention. Examples 1 to 3 illustrate the method for synthesis of radiation-curable poly(isobutylene). The method uses the living carbocationic polymerization of isobutylene, followed by end capping with either 2,2-difurylpropane (DFP) or thiophene. Examples 4 and 5 illustrate the results of radiation curing of the polymers prepared in Examples 1–3 under various conditions.

Materials 2,6-Di-t-butylpyridine (DTBP) was purchased from Maybridge Chemical Company.

Isobutylene (IB) and methyl chloride ($CH_3Cl$) was purchased from Air Products and Chemical, Pa.

Hexanes, titanium (IV) chloride ($TiCl_4$) and thiophene were purchased from Aldrich Chemical, Wis., USA.

Butanediol divinylether (BDDVE) was purchased from BASF Corp. Mt. Olive N.J.

2-Hydroxy-2-methyl-1-phenyl-propan-1-one (Darocure® 1173) was purchased form Ciba Speciality Chemicals Corp. Tarrytown N.Y.

Diaryliodonium hexafluoroantimonate was purchased from GE Silicones, Waterford N.Y.

1,3-Di(1-chloro-1-methylethyl)-5-(t-butyl)benzene was synthesized as per literature procedure set forth in *J. Polym. Sci, Polym. Chem. Ed.* (1984), 22:2685, the entire teachings of which are incorporated herein by reference.

1,3,5-Tri(1-chloro-1-methylethyl)benzene was synthesized as per literature procedure set forth in U.S. Pat. No. 4,276,394, the entire teachings of which are incorporated herein by reference.

2,2-Difurylpropane was synthesized as per literature procedure set forth in U.S. Pat. No. 5,260,378, the entire teachings of which are incorporated herein by reference.

Purification of Reagents 2,6-Di-t-butylpyridine was purified by vacuum distillation from calcium hydride.

Isobutylene and $CH_3Cl$ were purified by passage through a in-line gas purifier columns packed with barium oxide and drierite.

Hexane was purified by refluxing over concentrated sulfuric acid for 48 hours. After refluxing, the hexane was washed with 10% aqueous sodium hydroxide solution and followed by deionized water until neutral. After washing with deionized water, the hexane was stored over magnesium sulfate for 12 hours, then refluxed over calcium hydroxide overnight and distilled under a nitrogen atmosphere.

Differential Photocalorimetry Studies

The cure studies were conducted using a 930 model DPC (DuPont Instruments, Wilmington, Del. and a model 910 differential scanning calorimeter (DSC, DuPont Instruments) equipped with an Oriel 200 watt high pressure mercury arc lamp. A computer activated shutter blade controlled the UV exposure time. The UV intensity was quantified with a UV radiometer. The UV radiation passed through UV windows into a temperature-controlled oven of the DuPont 910 differential scanning calorimeter (DSC). The sample was placed in an open aluminum pan inside the DSC oven. A constant weight of approximately 10 milligrams was used for each measurement. The sample temperature was obtained from a thermocouple, which was calibrated for the melting point of indium. The data was analyzed using V4.1A DuPont 2100 software.

Example 1

Synthesis of 2,2-Difurylpropane Functionalized Telechelic Poly(isobutylene) (POLY 1)

Hexane (893 mL) was placed into a 2 liter reaction flask and cooled to −80° C. $CH_3Cl$ (533 mL) was added followed by the addition of a solution of 2,6-di-t-butylpyridine. A solution of $TiCl_4$ was added next, and the mixture was stirred for 5 minutes. Then an initiator (5-t-butyl-dicumyl chloride) solution was introduced followed by the immediate addition of isobutylene. After 60 minutes of polymerization a solution of 2,2-difurylpropane was introduced and allowed to react for 60 minutes after which the reaction was quenched with prechilled methanol. The reaction mixture contained the following concentrations of reagents: Initiator concentration=0.0046M, $TiCl_4$ concentration=0.036M, 2,6-di-t-butylpyridine concentration=0.003M, isobutylene coincentration=0.36M, 2,2-difurylpropane concentration=0.03M. The final product had a number average molecular weight ($M_n$) of 5200 and a molecular weight distribution ($M_w/M_n$) of 1.08.

Example 2

Synthesis of 2,2-Difurylpropane Functionalized Triarm Star Poly(isobutylene) (POLY 2)

Hexane (792 mL) was placed into a 2-liter reaction flask and cooled to −80° C. $CH_3Cl$ (473mL) was added followed by the addition of a solution of 2,6-di-t-butylpyridine. A solution of $TiCl_4$ was added next, and the mixture was stirred for 5 minutes. Then an initiator (1,3,5-tricumyl chloride) solution was introduced followed by the immediate addition if isobutylene. After 60 minutes of polymerization, a solution of 2,2-difurylpropane was introduced and allowed to react for 60 minutes after which the reaction was quenched with prechilled methanol. The reaction mixture contained the following concentrations of reagents: Initiator=0.003M, $TiCl_4$=0.036M, 2,6-di-t-butylpyridine=0.003M, isobutylene=0.43M, 2,2-difurylpropane=0.029M. The final product had a number average molecular weight ($M_n$) of 9400 and a molecular weight distribution ($M_w/M_n$) of 1.10.

Example 3

Synthesis of Thiophene Functionalized Telechelic Poly(isobutylene) (POLY 3)

A 3 L round bottom flask equipped with a mechanical stirrer was placed in the cooling bath at −80° C. and 700 ml hexanes and 410 ml of $CH_3Cl$ were placed into the flask. Under stirring a solution of 0.783 ml 2,6-di-t-butylpyridine in 20 ml of hexanes at room temperature was added, followed by the addition of the solution of 4.6 ml $TiCl_4$ in 15 ml hexanes at room temperature and 15 ml $CH_3Cl$ at −80°

C. was added. A light green color was observed. After 5 min mixing, the solution of 1,3-di(1-chloro-1-methylethyl)-5-(t-butyl)benzene (1.5353 g in 30 ml hexanes at room temperature and 25 ml $CH_3Cl$ at −80° C.) was introduced to the flask followed by the immediate addition of 32.5 ml of isobutylene. After 90 minute polymerization time, polymer solution was transferred by a teflon tube under $N_2$ pressure and added drop wise during 30 min to a stirred solution of 56 ml thiophene in 100 ml of $CH_3Cl$ in a 2 L flask placed in the cold bath. After 1 h, the solution was quenched with 150 ml of anhydrous methanol and was mixed for 5 minute. The polymer was characterized by gel permeation chromatography (GPC) ($M_n$=5100, MWD=1.13).

Example 4

Ultraviolet Light (UV) Curing Studies

The UV cure formulations were mixed in a Hauschild mixer by adding the desired amounts of components as noted in Table 1.

TABLE 1

Radiation-curable compositions used for UV curing studies.

| | Polyisobutylene (wt. %) | Diluent (wt. %) | Photocatalyst (wt. %) |
|---|---|---|---|
| A | POLY 1 (79%) | Butanediol divinylether (20%) | Darocur ® 1173 (0.5%); UV 9380C (0.5%) |
| B | POLY 2 (79%) | Butanediol divinylether (20%) | Darocur ® 1173 (0.5%); UV 9380C (0.5%) |
| C | POLY 3 (79%) | Butanediol divinylether (20%) | Darocur ® 1173 (0.5%); UV 9380C (0.5%) |

Formulations A, B and C were drawn down into 0.38 mm thick films using a Bird Bar and cured using UV light with intensity of 520 and 1044 $mJ/cm^2$ on an aluminum foil. The coated foil was placed in a pre-dried thimble and total weight was recorded ($W_2$). The thimble was then placed in a soxhlet apparatus and UV cured sample was extracted with hexane for 24 hours. After extraction the thimble and its contents were dried in a vacuum oven for 48 hours at 80° C. The weight of the thimble and its contents after drying was recorded ($W_1$). The gel content was calculated as: ($W_1/W_2$)× 100. The results are shown in the Table 2.

TABLE 2

Percentage of crosslinked polymer after UV curing of radiation-curable compositions A, B, and C and extraction of non-crosslinked polymer.

| Sample | Cure Energy (mJ/cm²) | Gel Content |
|---|---|---|
| A | 520 | 85.8% |
| | 1044 | 85.2% |
| B | 520 | 81.8% |
| | 1044 | 84.5% |
| C | 520 | 81.1% |
| | 1044 | 83.3% |

The percent conversion of the alkenyl groups up on UV exposure was calculated by infrared spectroscopy using the alkenyl bands in the 1840 to 1520 wavenumber region. The percent conversion was calculated by measuring the area under the infrared bands for alkenyl bonds, before and after UV curing. The results are shown in Table 3.

TABLE 3

Percentage of crosslinked end-capping groups after UV curing of radiation-curable compositions A, B, and C determined through infrared spectroscopy.

| Sample | Cure Energy (mJ/cm²) | Percent Conversion |
|---|---|---|
| A | 520 | 73% |
| | 1044 | 66% |
| B | 520 | 62% |
| | 1044 | 65% |
| C | 520 | 82% |
| | 1044 | 80% |

Example 5

Differential Photocalorimetry (DPC) Studies

Radiation-curable compositions A, B, and C were evaluated for their cure speeds as a function of cure energy and temperature. In each measurement, the sample size was held constant at 10±1 milligrams. The sample was allowed to equilibrate at the desired temperature for 5 minutes prior to exposure to UV light. The cure speed (Watts/gram/min.) was calculated as the slope of the line from the onset of reaction to the peak, in the DPC curve. The results are shown in the Table 4.

TABLE 4

Cure Speed as a function of cure energy and temperature of radiation-curable compositions A, B, and C.

| Sample | Temperature (° C.) | Cure Energy (mJ/cm²) | Cure Rate (Watts/gram/min.) |
|---|---|---|---|
| A | 25 | 60.7 | 31.3 |
| | | 108.5 | 64.0 |
| | | 252.0 | 23.0 |
| | | 515.0 | 36.0 |
| B | 25 | 60.7 | 9.0 |
| | | 108.5 | 36.0 |
| | | 252.0 | 96.0 |
| | | 515.0 | 61.0 |
| C | 25 | 60.7 | 34.0 |
| | | 118.5 | 56.5 |
| | | 252.0 | 69.0 |
| | | 496.0 | 136.5 |
| C | 100 | 62.3 | 89.6 |
| | | 119 | 93.2 |
| | | 250 | 85.2 |
| | | 496 | 189.0 |

The low percentage of extractibles (see Table 2) and high infrared conversion (see Tabel 3) in combination with DPC cure rate studies (see Table 4) indicates that difuryl and thiohenyl functional polyisobutylene formulations undergo facile UV cure.

While this invention has been particularly shown and described with references to preferred embodiments thereof, it will be understood by those skilled in the art that various changes in form and details may be made therein without departing from the scope of the invention encompassed by the appended claims.

What is claimed is:

1. A radiation-curable composition, comprising a cationic photoinitiator and a radiation-curable polymer represented by Structural Formula I:

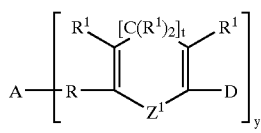

wherein:
A is a substituted or unsubstituted hydrocarbon;
R is a polymer chain;
$Z^1$ is selected from the group consisting of —O—, —S— and —NR$^7$—;
D is —H or a group represented by Structural Formula II:

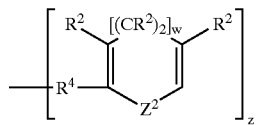

$Z^2$ is selected from the group consisting of —O—, —S— and —NR$^8$—;
$R^1$ and $R^2$ or each occurrence are, independently, selected from the group consisting of —H, —OR$^5$, —NR$^5$R$^6$, a substituted or unsubstituted alkyl, a substituted or unsubstituted cycloalkyl, and a substituted or unsubstituted heterocycloalkyl;
$R^4$ is selected from a substituted or unsubstituted alkylene, a substituted or unsubstituted cycloalkylene, a substituted or unsubstituted heteroalkylene, and a substituted or unsubstituted heterocycloalkylene;
$R^5$ and $R^6$ are each, independently, selected from the group consisting of —H, a substituted or unsubstituted alkyl, a substituted or unsubstituted cycloalkyl, and a substituted or unsubstituted heterocycloalkyl; or
$R^5$ and $R^6$ together with the nitrogen to which they are attached form a substituted or unsubstituted heterocycloalkyl; and
$R^7$ and $R^8$ are each, independently, selected from the group consisting of —H, a substituted or unsubstituted alkyl, a substituted or unsubstituted cycloalkyl, and a substituted or unsubstituted heterocycloalkyl;
t and w are each independently 0 or an integer from 1–5; and
y and z are each, independently, a positive integer.

2. The composition of claim 1, wherein:
$Z^1$ is —O—;
t is 0;
D is —H;
R is a polymer chain wherein at least 50% of the repeating units of the polymer chain are isobutylene units;
$R^1$ for each occurrence is —H;
y is 2 or 3; and
A is a divalent or trivalent phenyl.

3. The composition of claim 1 wherein:
$Z^1$ is —O—;
t is 0;
D is a group represented by Structural Formula II;
$Z^2$ is —O—;
w is 0;
R is a polymer chain wherein at least 50% of the repeating units of the polymer chain are isobutylene units;
$R^1$ and $R^2$ for each occurrence are —H;
$R^4$ is an alkylene;
y is 2 or 3;
z is 1; and
A is a divalent or trivalent phenyl.

4. The composition of claim 1 wherein:
$Z^1$ is —S—;
t is 0;
D is —H;
R is a polymer chain wherein at least 50% of the repeating units of the polymer chain are isobutylene units;
$R^1$ for each occurrence is —H;
y is 2 or 3; and
A is a divalent or trivalent phenyl.

5. The composition of claim 1, wherein the cationic photoinitiator is selected from the group consisting of an onium salt, a diaryliodonium salt of sulfonic acid, a triarylsulfonium salt of sulfonic acid, a diaryliodonium salt of boric acid, and a triarylsulfonium salt of boric acid.

6. The composition of claim 5, wherein the cationic photoinitiator is diaryliodonium hexafluoroantimonate.

7. A radiation-curable polymer represented by Structural Formula III:

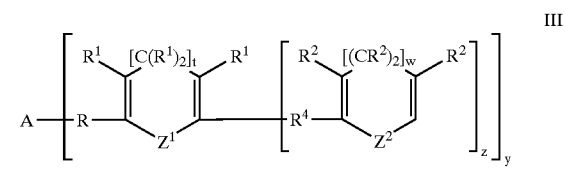

wherein:
A is a substituted or unsubstituted hydrocarbon;
R is a polymer chain;
$Z^1$ is selected from the group consisting of —O—, —S— and —NR$^7$—;
$Z^2$ is selected from the group consisting of —O—, —S— and —NR$^8$—;
$R^1$ and $R^2$ for each occurrence are, independently, selected from the group consisting of —H, —OR$^5$, —NR$^5$R$^6$, a substituted or unsubstituted alkyl, a substituted or unsubstituted cycloalkyl, and a substituted or unsubstituted heterocycloalkyl;
$R^4$ is selected form a substituted or unsubstituted alkylene, a substituted or unsubstituted cycloalkylene, a substituted or unsubstituted heteroalkylene, and a substituted or unsubstituted heterocycloalkylene;
$R^5$ and $R^6$ are each, independently, selected from the group consisting of —H, a substituted or unsubstituted alkyl, a substituted or unsubstituted cycloalkyl, and a substituted or unsubstituted heterocycloalkyl; or
$R^5$ and $R^6$ together with the nitrogen to which they are attached form a substituted or unsubstituted heterocycloalkyl; and
$R^7$ and $R^8$ are each, independently, selected from the group consisting of —H, a substituted or unsubstituted alkyl, a substituted or unsubstituted cycloalkyl, and a substituted or unsubstituted heterocycloalkyl;
t and w are each independently 0 or an integer from 1–5; and
y and z are each, independently, a positive integer.

8. The polymer of claim 7 wherein:

$Z^1$ and $Z^2$ are —O—;

t and w are 0;

R is a polymer chain wherein at least 50% of the repeating units of the polymer chain are isobutylene units;

$R^1$ and $R^2$ for each occurrence are —H;

$R^4$ is an alkylene;

y is 2 or 3;

z is 1; and

A is a divalent or trivalent phenyl.

9. The polymer of claim 8, wherein $R^4$ is methylene or dimethylmethylene.

10. The polymer of claim 7 wherein:

$Z^1$ and $Z^2$ are —S—;

t and w are 0;

R is a polymer chain wherein at least 50% of the repeating units of the polymer chain are isobutylene units;

$R^1$ and $R^2$ for each occurrence are —H;

$R^4$ is an alkylene;

y is 2 or 3;

Z is 1; and

A is a divalent or trivalent phenyl.

11. The polymer of claim 10, wherein $R^4$ is methylene or dimethylmethylene.

12. A method of forming a radiation-curable polymer, represented by Structural Formula I:

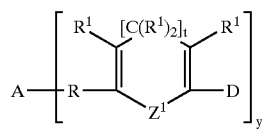

wherein:

A is a substituted or unsubstituted hydrocarbon;

R is a polymer chain;

$Z^1$ is selected from the group consisting of —O—, —S— and —NR$^7$—;

D is —H or a group represented by Structural Formula II:

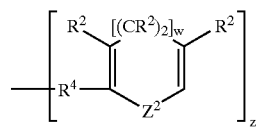

$Z^1$ is selected from the group consisting of —O—, —S— and —NR$^8$—;

$R^1$ and $R^2$ for each occurrence are, independently, selected from the group consisting of —H, —OR$^5$, —NR$^5$R$^6$, a substituted or unsubstituted alkyl, a substituted or unsubstituted cycloalkyl, and a substituted or unsubstituted heterocycloalkyl;

$R^4$ is selected from a substituted or unsubstituted alkylene, a substituted or unsubstituted cycloalkylene, a substituted or unsubstituted heteroalkylene, and a substituted or unsubstituted heterocycloalkylene;

$R^5$ and $R^6$ are each, independently, selected from the group consisting of —H, a substituted or unsubstituted alkyl, a substituted or unsubstituted cycloalkyl, and a substituted or unsubstituted heterocycloalkyl; or $R^5$ and $R^6$ together with the nitrogen to which they are attached form a substituted or unsubstituted heterocycloalkyl; and $R^7$ and $R^8$ are each, independently, selected from the group consisting of —H, a substituted or unsubstituted alkyl, a substituted or unsubstituted cycloalkyl, and a substituted or unsubstituted heterocycloalkyl;

t and w are each independently 0 or an integer from 1–5; and y and z are each, independently, a positive integer, comprising the steps:

a) contacting under reaction conditions a cationically polymerizable monomer with a cationic polymerization catalyst to produce a living polymer; and thereafter;

b) reacting the living polymer with an end capping compound having the following structural formula:

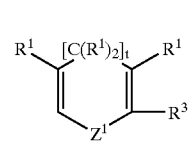

wherein:

$R^3$ is is —Sn(R$^{18}$)$_3$, —Si(R$^{18}$)$_3$ or —D, thereby forming the radiation-curable polymer.

13. The method of claim 12, wherein an initiator is contacted with a cationic polymerization catalyst under reaction conditions followed by addition of the cationic polymerizable monomer.

14. The method of claim 13 wherein:

the initiator is a substituted benzene having from one to three 1-chloro-1-methylethyl groups and from zero to about three t-butyl groups; and the cationic polymerization catalyst is TiCl$_4$ or BCl$_3$.

15. The method of claim 14, wherein:

$Z^1$ and $Z^2$ are —O—;

t and w are 0;

$R^3$ is —D and is a group represented by Structural Formula II;

$R^4$ is an alkylene;

z is 1; and the living polymer comprises at least 50% isobutylene units.

16. The method of claim 14, wherein:

$Z^1$ and $Z^2$ are —S—;

t and w are 0;

$R^3$ is —D and is a group represented by Structural Formula II;

$R^4$ is an alkylene;

z is 1; and the living polymer comprises at least 50% isobutylene units.

17. A radiation-curable polymer prepared by the method of claim 12.

* * * * *